UNITED STATES PATENT OFFICE

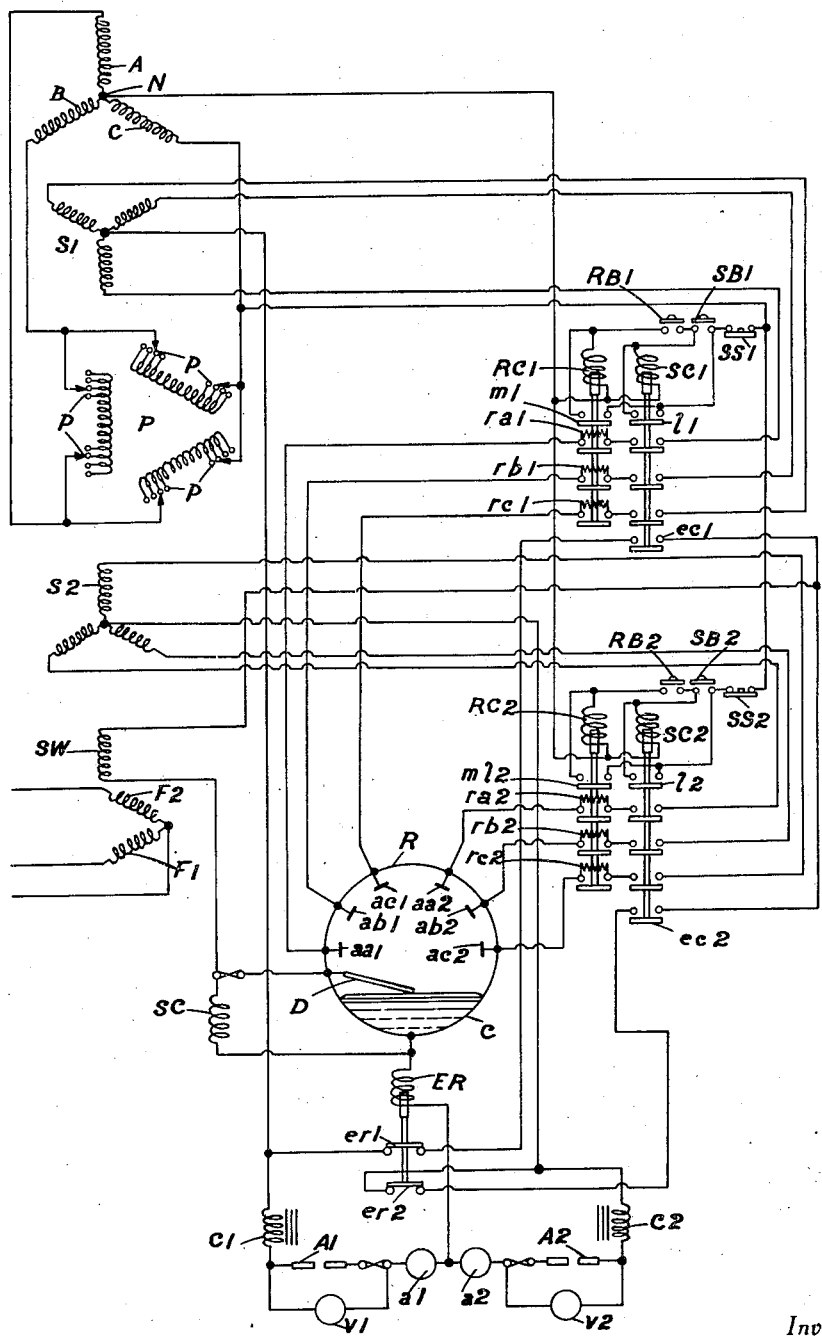

2,471,641

SUPPLY EQUIPMENT FOR ELECTRIC ARCS

John Charles Milne, Wolverhampton, England, assignor to The Electric Construction Company Limited, Wolverhampton, England, a British Company Application January 4, 1949, Serial No. 69,117
In Great Britain May 27, 1946

3 Claims. (Cl. 315—141)

This invention relates to electrical installations for supplying and controlling arc lamps and has particular reference to such equipment for use with projector arcs in cinemas and theatres.

It is usual to provide two or more projectors which can be used to make it possible to change over from one length of film to another without any apparent break to the audience. This usually requires that as the end of one film is approached, the next film, or length of film is inserted in the gate of a second projector and the arc in the latter is switched on in readiness for the change-over. Furthermore, owing to the properties of cinema arcs, it has been usual to provide a ballast resistance or choke coils in series with the arc to stabilise the latter under working conditions. The use of these, however, has the disadvantage of reducing the efficiency and one purpose of the present invention is to render them unnecessary.

In such electrical supply equipment fed from alternating current mains through a transformer and a vapour rectifier, it has been usual to employ separate transformers and rectifiers for the two arcs in order to avoid any interaction or interference, since otherwise, if the first arc is operating, on switching on the second arc, the first arc is liable to be momentarily dimmed and to produce an unfavourable effect on the illumination of the screen and on the audience. It is expensive to provide two sets of equipment and some saving has been effected by feeding both arcs through the same mercury vapour rectifier which then would have six anodes in the case of a three phase supply, three anodes co-operating in the supply to each arc.

The present invention aims at simplifying still further the equipment by employing, in conjunction with a single mercury vapour rectifier, a single transformer for both arcs and in such a way that the transformer itself provides the necessary ballast and that undesirable interference between the arcs does not occur, in spite of ideas on this subject which have been held up to the present.

According to the present invention, a single transformer used in such a system has two secondary windings associated with its primary winding, each secondary winding being connected through one set of electrodes of the rectifier to the respective arc and the secondary windings connected so that they operate 180 degrees out of phase and thus the interference referred to is avoided.

In the case of a three-phase supply, the transformer may have the usual three-limbed core and each limb bears one phase of the primary winding with one phase of the two secondary windings on opposite sides of it. The desirable characteristics are given to the arc by arranging for the ballast to be produced by arranging the transformer coils with gaps between the primary and secondary windings adjusted during the assembly of the transformer, so that there is considerable magnetic leakage. The primary winding will usually be delta-connected while the secondary windings will each be star-connected but with the phases 180 degrees out of phase and joined to two sets of anodes of the mercury vapour rectifier so that the two sets of electrodes operate to rectify during the halves of the alternating current of opposite sign.

Both arcs are connected, on one side, to the cathode of the rectifier and each arc is connected, on the other side, to the neutral point of the associated secondary winding of the transformer.

The invention will now be further explained with reference to the annexed drawing which is a circuit diagram of an example of the system connected in accordance with the invention.

The three phase source of supply is shown as a star-connected three-phase alternator with the three phases shown at A, B and C and the neutral point at N. It supplies the mesh-connected primary winding P of the transformer employed. The number of effective turns of the winding P is adjusted by means of two 3-pole rotary switches with four positions providing sixteen tappings, the adjustment being course at one end of each phase and fine at the other, the tapping being shown at $p$. The secondary windings S1, S2 are star-connected with the phases of each placed on the three limbs of the transformer core on opposite sides of the respective phases of the primary winding P and with gaps between the primary and secondary windings set by spacing washers during the assembling of the transformer. It will be noted that the two secondary windings are connected for the two windings to produce voltages in phase opposition. Each secondary winding is connected to three of the anodes $aa1$, $ab1$, $ac1$ and $aa2$, $ab2$ and $ac2$ of a six-phase vapour rectifier R of the mercury pool type through three poles of a starting contactor SC1 or SC2 and three poles of a running contactor RC1 or RC2. The windings of the four contactors are excited from the phase C of the alternating source of supply through a stop button SS1 or SS2, a starting button SB1 or SB2 and a running button RB1 or RB2.

If one of the starting buttons, for example,

SB1 is closed, the starting contactor SC1 is operated and closes a locking circuit at the contact $l_1$ and the circuit of projection arc A1 is completed from the secondary winding S1, main contacts of contactor SC1, resistances $ra1$, $rb1$ and $rc1$, to the anodes $aa1$, $ab1$ and $ac1$ of the rectifier R to the cathode C, exciter relay ER, ammeter $a1$, arc A1, cathode choke C1 to the neutral point of the transformer secondary winding S1.

To start the rectifier R so that current can flow in the above circuit, the carbons of the arc A1 are brought together and a secondary starting winding SW of the transformer supplies current through the rectifier starting coil SC, through the exciter relay ER, ammeter $a1$, cathode choke C1, contacts $er1$ of the exciter relay ER, contacts $ec1$ of the contactor SC1 and back to the starting secondary winding SW. The dipper D operates and the rectifier R strikes in the ordinary manner and the current flows through the rectifier R and arc A1 by way of the circuit described above. The relay ER is then energised and opens the contacts $er1$ and thus disconnecting the starting circuit. Then on pressing the running button RB1, the contactor RC1 is operated and is locked at the contacts $m1$ and short-circuits the resistances $ra1$, $rb1$ and $rc1$ and then the first arc A1 is running normally. The contractors RC1 and SC1 are interlocked at the contacts $l1$, making it impossible to operate the contactor RC1 until the contactor SC1 is closed. If the button RB1 is closed by mistake before the button SB1, there is no connection from the phase C of the supply to the winding of the cathode RC1.

When a change-over has to be made, the second arc A2 is started up in a way similar to that described for arc A1 except that as the second arc is started before the first is switched off, the starting gear for the rectifier bulb does not operate and is only required initially when the first arc is struck; the circuit parts coming into play have been marked with similar characters to those already referred to for starting the arc A1 except that the suffix 2 has been added. The arc A1 can then be shut down by opening the stop button SS1 which then release the contactors SC1 and RC1.

Each of the arcs A1 and A2 has a voltmeter V1 or V2 connected across it to assist in the regulation of the length of the arc. Two transformer secondary windings F1, F2 similar to the winding SW but wound on the other two limbs of the transformer core are connected to supply a small three phase motor for driving a fan for cooling the bulb of the rectifier R.

I claim:

1. An alternating current electric equipment for supplying a pair of projection arc lamps, comprising a transformer having two secondary windings connected to operate in phase-opposition and a mercury vapour rectifier having two sets of electrodes establishing two distinct conductive paths in said rectifier, said two sets of electrodes being connected in circuit respectively with said secondary windings and with the projection arc lamps.

2. A three-phase alternating current electric equipment for supplying a pair of projection arc lamps, comprising a three-limbed three-phase transformer, each limb bearing one phase of the primary winding and one phase of two secondary windings one on each side of the respective phase of the primary winding and a mercury vapour rectifier having two sets of three-phase electrodes establishing two distinct conductive paths in said rectifier, said two sets of electrodes being connected in circuit respectively with said secondary windings and with the projection arc lamps.

3. A three-phase alternating current electric equipment according to claim 2, wherein the phases of the secondary windings of said transformer are spaced from the respective phases of the primary winding by predetermined distances in order to establish the ballast action of maintaining a steady operation of the arc lamps.

JOHN CHARLES MILNE.

No references cited.